United States Patent [19]

Utsugi

[11] Patent Number: 4,601,573

[45] Date of Patent: Jul. 22, 1986

[54] CONTINUOUS PHOTO MOUNT

[75] Inventor: Mikio Utsugi, Tokyo, Japan

[73] Assignee: Fuji Photo Film Co., Ltd., Japan

[21] Appl. No.: 659,181

[22] Filed: Oct. 9, 1984

[30] Foreign Application Priority Data

Oct. 7, 1983 [JP] Japan .......................... 58-155025[U]
Oct. 7, 1983 [JP] Japan .......................... 58-155026[U]
Oct. 7, 1983 [JP] Japan .......................... 58-155028[U]

[51] Int. Cl.[4] .............................................. G03B 27/62
[52] U.S. Cl. ...................................... 355/75; 355/133
[58] Field of Search ..................... 355/50, 51, 75, 133; 40/152, 159

[56] References Cited

U.S. PATENT DOCUMENTS 4,405,228 9/1983 Muscoplat ............................ 355/75

FOREIGN PATENT DOCUMENTS 2320940 4/1973 Fed. Rep. of Germany ........ 355/75
119153 9/1981 Japan .................................... 355/75

*Primary Examiner*—Richard A. Wintercorn
*Attorney, Agent, or Firm*—Jordan B. Bierman

[57] ABSTRACT

A continuous photo mount comprising a mount body comprising a surface sheet and a rear sheet, said rear and surface sheets affixed to each other so as to form at least one pocket having an open portion whereby said pocket is adapted to receive a sheet-like object, wherein said pocket has a window for viewing said object, and at least one hole through one of said surface sheet and said rear sheet, and an adhesive means for affixing said object to said mount sheet body through at least one of said holes.

17 Claims, 12 Drawing Figures

CONTINUOUS PHOTO MOUNT

This Application claims priority of Japanese Applications Nos. 155025/83, 155026/83, and 155028/83, all filed Oct. 7, 1983.

BACKGROUND OF THE INVENTION

This invention relates to a continuous photo mount sheet which, in its preferred form, can be used for observing photographed objects, such as printed pictures, in a sequential arrangement. The invention is also useful in a video recording system (hereinafter referred to as a video printer) when these pictures are recorded by a video camera on magnetic tapes, magnetic discs, etc.

As video cameras have gained popularity in recent years, video TV albums are coming into increasing use. People generally video-record onto a video tape for reproduction with appropriate equipment as desired. However, there are inconveniences and problems involved when the objects to be recorded consist of individual printed pictures. There has been a long-felt need and demand for a continuous photo mount which is appropriate for storage of video camera frame recordings and which is useful in sorting and safekeeping of printed pictures or other objects.

An important feature of a suitable continuous photo mount is that it permits the users to trim the printed copies and store them away in an organized and compact manner, while still being able to view a portion of the object for reference purposes. Such mounts should allow for material reproductions of originals by frame recording, notwithstanding blank spaces in the frame. The picture to be recorded should be easily modifiable in the mount; additionally, the mount should be capable of being positioned precisely as desired with respect the video camera without difficulty and should not distort the pictures during recordation.

An object of the invention is to provide a photo mount which permits users to clearly visualize the picture as reproduced on conventional equipment. Another object is to provide a photo mount which allows freedom to trim and crop pictures as desired.

A further object is to permit quick and easy insertion and modification of photographed objects, as well as simple orientation and placement of the mounted pictures relative to the recording equipment.

It is also an object of the invention to reduce distortion and displacement of the pictures to be viewed and/or recorded.

A still further object is to provide a mount which will signal its end to recording equipment so as to stop recordation. Another object is to permit the inclusion of means to communicate necessary data to the recording equipment.

Another object is to provide a mount which can accommodate elongated pictures and film frames without impeding the recording process. It is also an object of this invention to eliminate unnatural appearances in the reproduced pictures due to blank portions left by elongated originals.

SUMMARY OF THE INVENTION

The photo mount of this invention comprises a mount body having two sheets attached so as to form a plurality of pockets. Each pocket has a window in one sheet and is open at the upper end so that a frame of film or a printed picture can be inserted therein. There is a small hole through at least one of the sheets in each pocket region. Preferably, the hole is in the rear sheet. On the sheet adjacent to the object, but on the opposite side thereof, a piece of adhesive tape is affixed so as to cover the hole. This results in the adhesive contacting the object in the region of the hole, thereby affixing it to the mount, and preventing discoloration.

In the accompanying drawings, like referenced characters designate like parts. However, the specific embodiments set forth are exemplary only and do not limit the scope of the invention.

BRIEF DESCRIPTION OF THE DRAWINGS

FIG. 1 (*b*) is a cross-sectional view along the line X—X of FIG. 1 (*a*).

DETAILED DESCRIPTION OF THE PREFERRED EMBODIMENTS

Figure 1A:
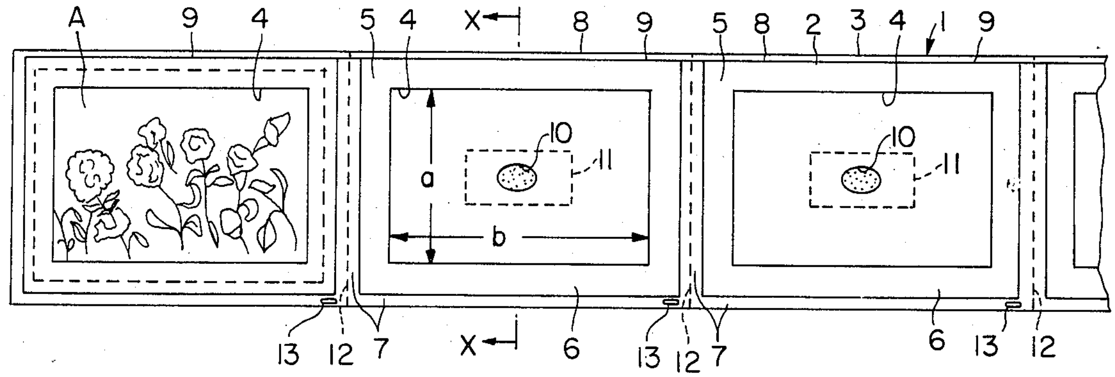
FIG. 1 (*a*) is a front view of an embodiment of a continuous photo mount according to this invention.
Figure 1B:
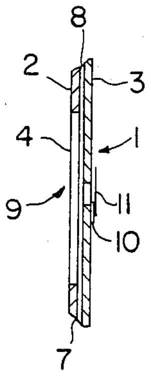

FIG. 1 (*a*) is a front view of a first embodiment of the photo mount according to this invention, and FIG. 1 (*b*) is a cross-sectional view along the line X—X of FIG. 1 (*a*). Mount body 1 comprises surface side band sheet 2 and rear side band sheet 3 which have a predetermined width and extend indefinately in the longitudinal direction. Windows 4 are provided on sheet 2 at preset intervals. In this embodiment, the frame size (a:b) of a window 4 corresponds to the aspect ratio of the reproducer (a:b=3:4 in the currently used TV screen), so that a user can see the appearance of the resultant reproduced picture merely by looking at the album. This will avoid the often-expressed complaints of users that the reproduced picture does not correspond with the original image.

Pockets 9, for storing a printed picture or film frame, are repeatedly formed in the longitudinal direction of the mount body 1 between the surface sheet 2 and the rear sheet 3, each having a window on the surface and an opening on the upper end thereof so that a printed picture of a film frame can be inserted therein. In this embodiment, pocket 9 is formed and contoured by contour 5 and adhesive-sealed portion 7, at the center of adjacent windows 4, and lower end 6. The sheets so sealed form pocket 9 having an opening at the upper end and a window at the center thereof. If a printed picture or a frame of film is inserted in pocket 9, it can be viewed as in the case of an ordinary album or can be video recorded through window 4 onto a video tape. For facilitating the insertion of such printed pictures or frames of film in the pockets, it is not always necessary to seal three sides to form a pocket; only the sides or the lower end 6 need be sealed.

A small elliptical hole 10 is provided on rear sheet 3 substantially at the center of window 4. Adhesive tape 11 is attached to the back of rear sheet 3 so as to cover small hole 10; hence, the printed picture or the frame of film in pocket 9 can be retained in the correct position and prevented from displacement or misalignment. Although there is only one hole in this embodiment, a plurality of such holes may be provided and at any suitable positions, whether or not visible through window 4. It is preferable to provide a hole at a position not visible through window 4 in case object A is transparent; e.g. a reversal film or a negative film. If hole 10 is perforated outside window 4, adhesive tape 11 may be attached to the outer surface of side sheet 2. The shape, number and position of holes 10 are by no means limited to those of this embodiment.

Positioning mark 13 may be provided at a predetermined position on mount body 1 to locate the position of the printed picture or the film in respect of the frame or window 4. This enables correct determination of the relative positions of the print or the film within window 4 and of the video camera. The type of positioning mark 13 depends on the detecting method; i.e. whether it is mechanical, magnetic or optical. For example, if an optical detecting system is used, one perforation suffices.

Folding line 12 is provided at the center of adjacent pockets 9 on body 1 so that body 1 can be easily and compactly folded. The material of body 1 may be paper, resin film or any other material so long as it can function as a photo mount sheet. If a transmission type picture is to be stored in pocket 9 and recorded by a video camera, another window may be opened on the rear sheet 3 corresponding to window 4 on the surface sheet 2. Alternatively, rear sheet 3 may be made of transparent material.

In the embodiment shown in FIG. 1, window 4 is rectangular and is spaced apart longitudinally from the adjacent window, but the dimensions and form of the window can be varied arbitrarily to suit a video TV album. The shape is not limited to a rectangle. The pocket may be made in a size sufficiently larger than either the area of window 4 or the print or film area so that a user can freely move the print or film within pocket 9 and thereby freely select the center of the images for reproduction.

In another embodiment of the invention, pocket 9 is formed on mount body 1 and has opening 8 and window 4. In forming such a pocket, sealed portion 7 may be provided with a piece of adhesive at contour 5 between adjacent windows 4. Unlike the first embodiment, the sealed portion is only between the adjacent windows.

Figure 2:
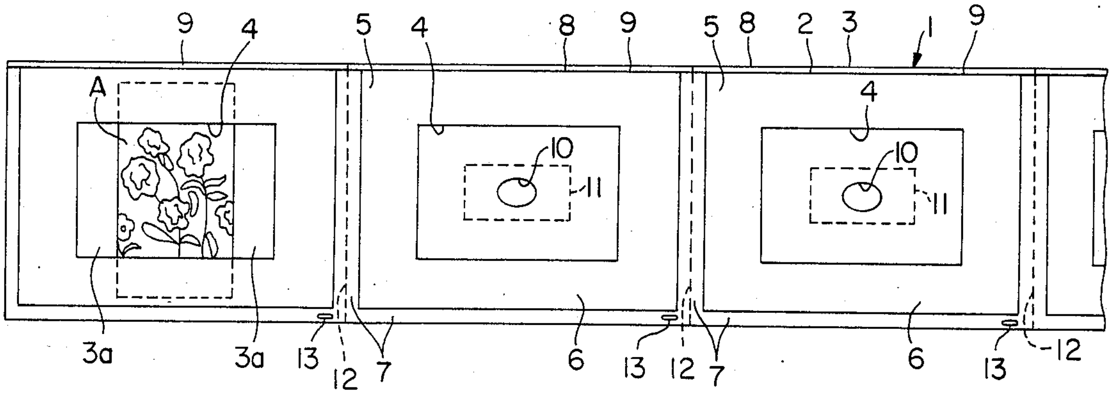
FIG. 2 is a front view of a further embodiment of the continuous photo mount according to this invention.

FIG. 2 is a front view of a fourth embodiment of this invention wherein the height of a mount body 1 is such as to allow insertion of an elongated object A in the pocket, so that it does not project from body 1 nor hinder the video recording operation. There may be blank excess window spaces 3*a* between the sides of the window and the ends of the print. If the side of the rear sheet 3 which is visible from the window is colored or patterned, the blank spaces will not look unnatural when projected onto a TV screen.

Figure 3:
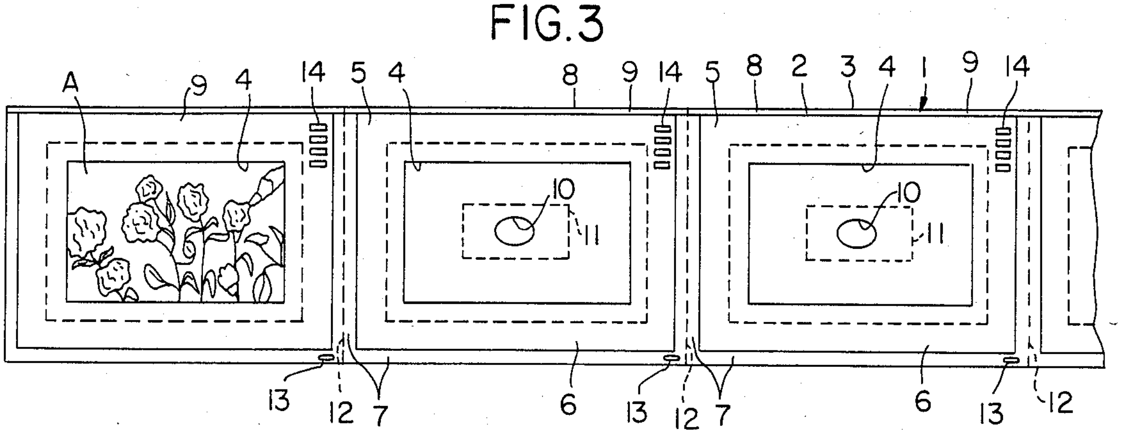
FIG. 3 is a front view of another embodiment of the continuous photo mount according to this invention.

FIG. 3 shows a fifth embodiment of this invention. Blank data recording spaces 14 are provided on the upper portion of body 1 so that specified data can be recorded. Such data includes the time for video recording, refinement of picture quality, the data, name of the photographer, location, whether it has been zoomed or not, positioning of the print in the vertical direction, etc. With such information, the users' specifications can be directly conveyed when recording. Data recording spaces 14 may be bar codes which are provided in advance; alternatively, it may be machine perforation or simply blank spaces on which a user can write or mark freely. If such recording space 14 is interlocked with a reading device, the data specified by users can be automatically incorporated at the time of video recording. Although recording spaces 14 are provided on surface sheet 2 in this embodiment, the position thereof is not limited thereto. Furthermore, the space may be used for any data regarded necessary or desirable for the video printer operation.

Figure 4:
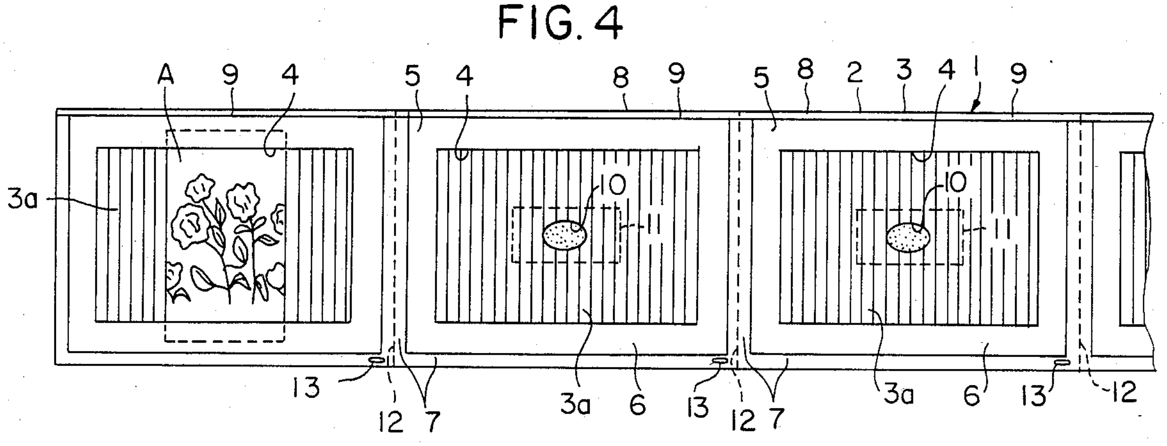
FIG. 4 is a front view of a still further embodiment of the continuous photo mount according to this invention.

FIG. 4 is a front view of a sixth embodiment of this invention wherein the excess window surface 3*a* is colored or patterned in a chromatic or an achromatic color. Preferably, rear sheet 3 is so colored or patterned; however, such coloring and patterns may appear at any point which does not interfere with viewing and recording of the desired portions of the object. This is effective in obscuring the boundary between the mount and the print on a TV screen when a narrow print or a film is inserted in the pocket and blank spaces are left. By using an appropriately colored sheet, the color balance of the user's receiver is improved. It is preferable to use blue or black, as these blur the blank spaces on the reproduced picture.

Figure 5A:
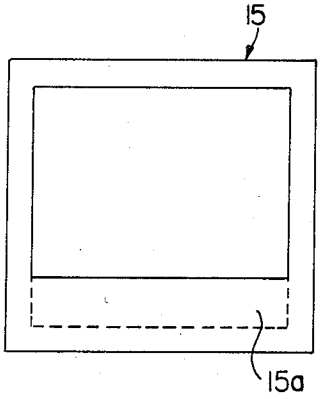
FIGS. 5 (*a*) through 5 (*c*) are the front views of intermediate mounts to be used in an additional embodiment of the continuous photo mount according to this invention.
Figure 5B:
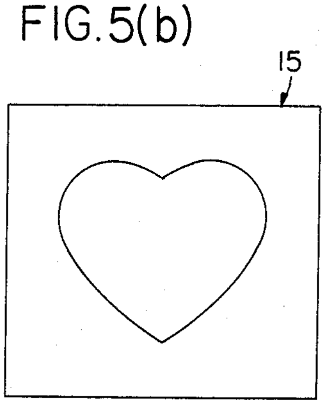
Figure 5C:
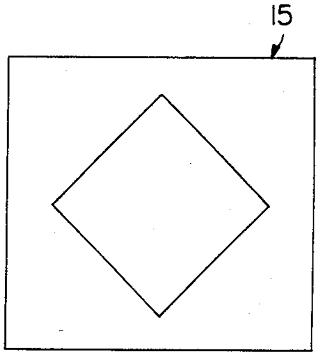

In a seventh embodiment, the reproduced picture can be modified or varied by an intermediate mount 15 which is optionally inserted in pocket 9 in a manner described hereinbelow. The intermediate mount 15 may be formed in a variety of shapes as shown in FIGS. 5 (*a*) through 5 (*c*); i.e. provided with a blank column for filling letters, a heart shape, a diamond shape, etc. Users can enjoy a variety of pictures for video recording simply by selecting a desirable intermediate mount 15. In the case shown in FIG. 5 (*a*) there is provided a horizontal column 15 a for writing the name of photographer and the date, or other pertinent information. A machine perforation can be provided around column 15*a* so as to remove such a column if it is not needed. The continuous photo mount according to this invention can naturally be used without the intermediate mount 15 and any of the small holes 10 may be used for fixing the intermediate mount 15.

Figure 6:
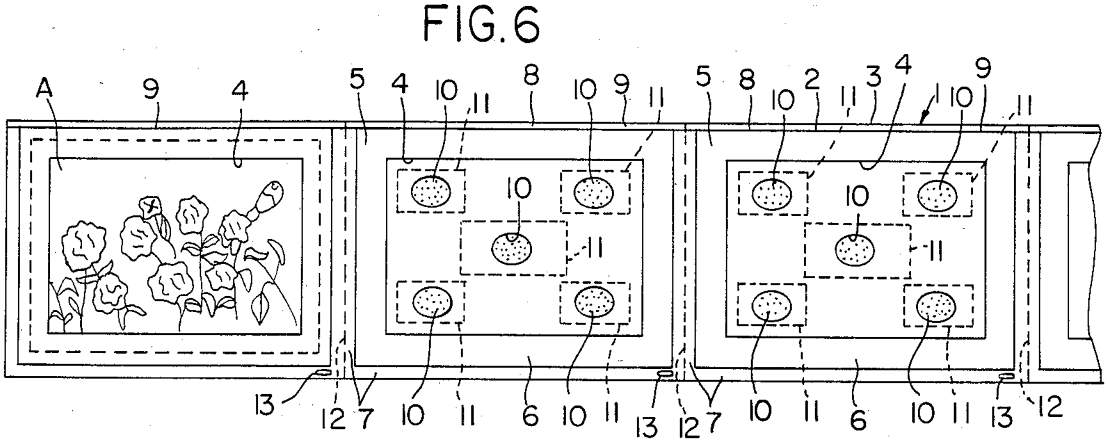
FIG. 6 is a front view of another embodiment of the continuous photo mount according to this invention.

FIG. 6 is a front view of an eighth embodiment of this invention. Rear sheet 3 of pocket 9 is perforated with fine small holes 10, one of which is positioned substantially at the center of window 4, and the rest surrounding the center hole on four sides. As a piece of adhesive tape 11 is attached on the rear surface of the rear sheet 3 to cover holes 10, a print or a film, once inserted in a pocket, can be secured at the right position without displacement or misalignment. Small holes 10, provided on the rear sheet 3, are exclusively for securing object A; therefore, five such holes are not required and they need be placed within the window region. Especially when object A is a reversal film or a negative film which is transparent, the holes are preferably at positions not visible from window 4. Moreover, a plurality of small holes 10 may be provided in a frame portion outside window 4. In such a case, adhesive tape 11 may be attached to the surface of sheet 2. In any case, the shape, number, and position of small holes 10 are by no means limited to the ones shown in this embodiment.

Figure 7:
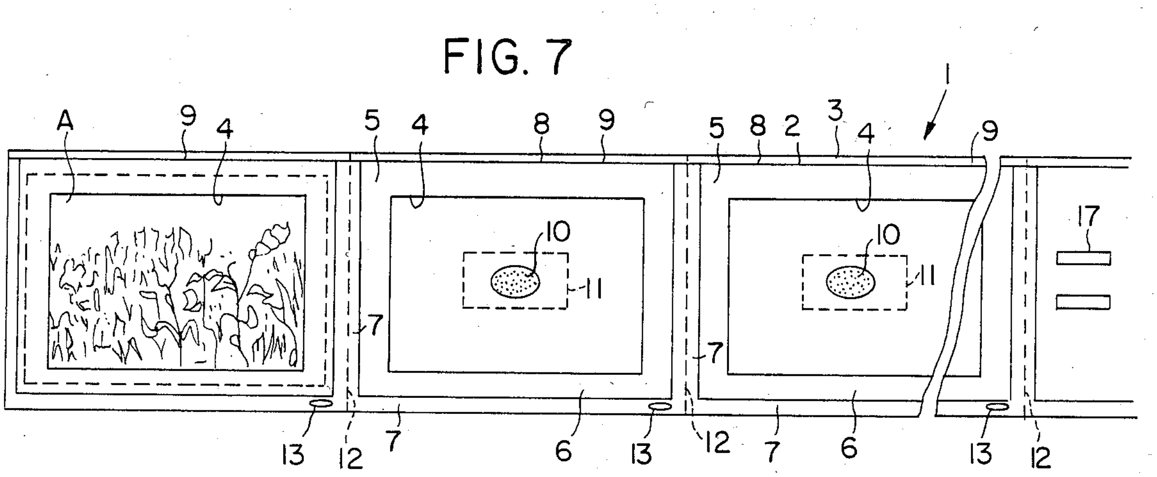
FIG. 7 is a front view of a still further embodiment of the continuous photo mount according to this invention.

FIG. 7 is a front view of a ninth embodiment of this invention wherein mark 17 and small holes 10 are utilized as a terminal detection means. More particularly, if a user inserted objects A in all of pockets 9 of a continuous photo mount sheet, then all small holes 10 are hidden behind objects A. In this case, mark 17, provided on the end, is used as a detection mark. However, when a user inserts objects A in one or more pockets 9 of a mount sheet with some pockets unfilled, then the small holes 10 will be visible through window 4 from pocket 9 immediately adjacent to the last pocket 9 which contains an object A. In this event, the first hole 10 not covered by an object may be used as a terminal detection mark.

Naturally, even in the latter case, mark 17 provided on the terminal of body 1 may be used as the terminal detection mark instead of hole 10. When a user asks for video recording of a number of albums simultaneously, if the terminal portion bearing mark 17 is superposed on the first page of another album, it will be hidden by the first page and mark 17 will not function as the terminal detection mark. Instead, small hole 10 or the next mark 17, whichever appears first, is used as the terminal detection mark. If holes 10 are not to be used as the terminal detection mark, they may be positioned at places invisible from the window 4.

Figure 8:
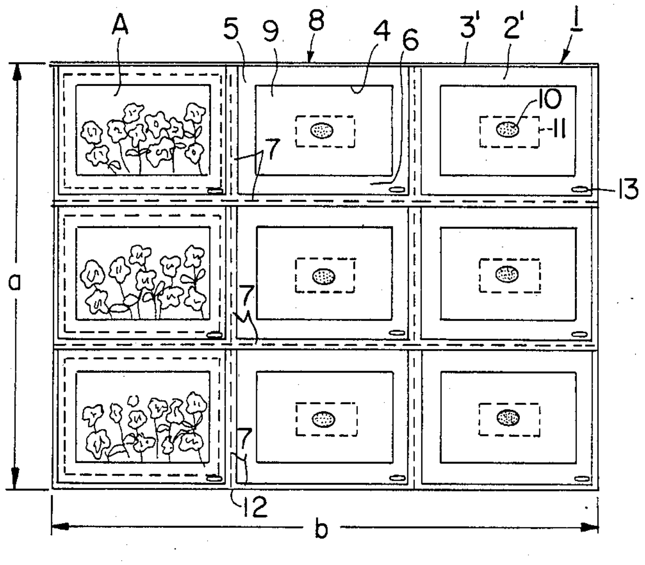
FIG. 8 is a front view of yet another embodiment of the continuous photo mount according to this invention.

FIG. 8 is a front view of a tenth embodiment of this invention wherein a mount body 1 comprises surface sheet 2' and rear sheet 3' of a predetermined width. Pockets 9 and windows 4 are formed on the surface sheet 2' at predetermined intervals horizontally as well as vertically. The upper portions of pockets 9 are open and capable of receiving objects A therein.

Although it is not necessary to restrict the size of the mount body 1 in this embodiment, it would be convenient for storage if the mount carrier is made 4 frames×3 frames for a total of 12 frames; this is a size similar to most magazines. If the ratio of the vertical dimension a to the horizontal dimension b of mount body 1 corresponds to the aspect ratio of the reproducing machine (currently a:b=3:4), mount body 1 as a whole can be contained within one frame of the reproduced picture. This will facilitate preparing an index of pictures before actually video recording individual objects A. In this manner, a user will be able to view an index of pictures to follow.

Mount body 1 shown in FIG. 8 can be made as a continuous photo mount by multiplying the unit shown in FIG. 8 in the longitudinal direction. In video recording such a continuous mount sheet, an easel movable both in X and Y directions should be required. Except for such an easel, all of the description made for the first embodiment is applicable to this embodiment.

Figure 9:
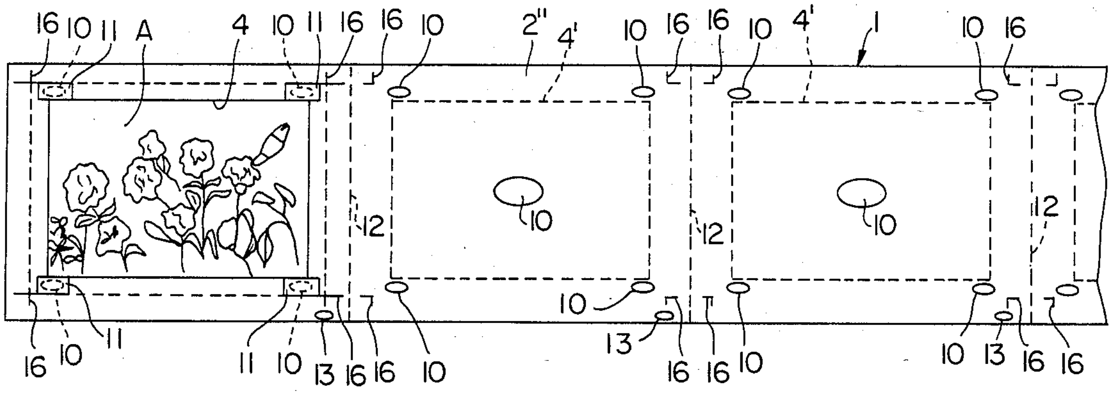
FIG. 9 is a front view to show a modified embodiment of the continuous photo mount according to this invention.

FIG. 9 is a front view of a modified embodiment of the continuous photo mount of this invention. Body 1 comprises sheet 2" having a predetermined width and extends endlessly in the longitudinal direction. Sheet 2" is machine-perforated to form windows at positions at predetermined intervals. Window 4' is used when the object A is fixed on the rear side of the sheet 2". When the inside of the perforation is removed, window 4 is defined through which video recording can be carried out.

When object A is fixed on the surface side of sheet 2", it should be in alignment with positioning line 16 provided on mount body 1. By aligning object A with line 16, distortion and/or misplacement of a picture frame can be prevented.

Sheet 2" carries elliptical holes 10 substantially at the center of the square defined by perforations 4' and at four positions on the periphery thereof. As adhesive tape 11 is attached on the surface side of sheet 2" to cover the holes, object A is prevented from displacement or misalignment.

When object A is fixed on the surface side of band sheet 2", adhesive tape 11 is attached from the rear side of sheet 2". Reference numeral 12 denotes a folding line and 13 a positioning mark for the film.

As described in detail in the foregoing, the continuous photo mount according to this invention can achieve the following effects:

(1) The pictures inserted in the pockets can be seen directly through windows as well as video recorded by a video camera as they are advanced frame by frame by a feeding mechanism.

(2) In video recording, object A is fixed by the adhesive tape through small holes within a pocket, thereby preventing its displacement. As the frame size of a window is made to conform to the aspect ratio of a reproducing machine, the user can visualize the result of a reproduced picture even when it is only in a "hard copy".

(3) When video recording is finished, the mount sheet can be easily folded at folding lines so that it can be stored compactly.

(4) Users can freely trim and crop the objects.

(5) Prints or film frames can easily be inserted into the pockets.

(6) The vertical dimension is sufficiently large so that, even if an elongated printed picture is inserted in a pocket, the end thereof will not stick out of the mount sheet body nor hinder the video recording.

(7) The data specified by users can be directly used for video recording.

(8) Even if blank spaces are left because of the shape of object A, there will be no unnatural look to the reproduced picture.

(9) If an intermediate mount sheet is used, users can freely enjoy a variety of recorded pictures.

(10) The objects can be easily kept in a secure and organized manner for reference or indexing purposes.

(11) Video recording can automatically be stopped at the proper point by detecting the end of the group of printed pictures.

(12) The relative positions of a video camera and a print or a film can be precisely determined with a positioning mark.

(13) If the ratio of vertical dimension to horizontal dimension of the mount sheet corresponds to the aspect ratio of the reproducing machine, it is possible to prepare an index of pictures easily.

What we claim is:

1. A continuous photo mount comprising a mount body comprising a surface sheet and a rear sheet, said rear and surface sheets affixed to each other so as to form at least one pocket having an open portion whereby said pocket is adapted to receive a sheet-like object, wherein said pocket has a window for viewing said object, and at least one hole through one of said surface sheet and said rear sheet, and an adhesive means for affixing said object to said mount sheet body through at least one of said holes.

2. The continuous photo mount of claim 1 having a plurality of pockets aligned end to end and wherein said mount body is foldable at a portion between at least one pair of said pockets.

3. The continuous photo mount of claim 2 wherein said surface and rear sheets are continuous sheets, said pockets are aligned in the longitudinal direction of said sheets, and said windows have a length which is parallel to said longitudinal direction and a height such that said height to length ratio corresponds to the aspect ratio of reproducing equipment.

4. The continuous photo mount of claim 1 wherein said pocket is significantly larger than said window in at least one dimension.

5. The continuous photo mount of claim 2 wherein said pockets are formed by sealing said surface and said rear sheets at portions which are about midway between two adjacent windows.

6. The continuous photo mount of claim 1 wherein said pocket is of sufficient size to accommodate therein an elongated object.

7. The continuous photo mount of claim 1 wherein a data recording space is provided in a non-window portion thereof.

8. The continuous photo mount of claim 1 wherein said object is affixed to said surface sheet or said rear sheet so that the sheet adjacent to the rear portion of said object is colored or patterned with a chromatic or achromatic color.

9. The continuous photo mount of claim 1 wherein said pocket is capable of receiving an intermediate mount having a predetermined opening which corresponds at least in part with said window.

10. The continuous photo mount of claim 1 wherein a plurality of said holes are present.

11. The continuous photo mount of claim 1 wherein a terminal end mark is provided on the longitudinal end of said photo mount.

12. The continuous photo mount of claim 1 wherein a positioning mark is provided for positioning said object relative to said window.

13. The continuous photo mount of claim 1 having a plurality of pockets laid end to end in a two dimensional pattern.

14. The continuous photo mount of claim 13 wherein the ratio of the vertical and horizontal dimensions of said two dimensional pattern is coincident with an aspect ratio of reproducing equipment.

15. The continuous photo mount of claim 3 wherein said aspect ratio is 3:4.

16. The continuous photo mount of claim 14 wherein said aspect ratio is 3:4.

17. The continuous photo mount of claim 1 wherein said means for affixing said object is a portion of adhesive tape applied over said hole wherein contact between said adhesive tape and said object affixes said object in position.

* * * * *